US012461955B2

(12) United States Patent
Minooei et al.

(10) Patent No.: US 12,461,955 B2
(45) Date of Patent: Nov. 4, 2025

(54) INTEGRATION FLOW GENERATION USING LARGE LANGUAGE MODELS

(71) Applicant: Salesforce, Inc., San Francisco, CA (US)

(72) Inventors: Hadi Minooei, San Francisco, CA (US); Yazdan Jamshidi, Winter Springs, FL (US); Yanqi Luo, San Francisco, CA (US); Santiago Bassani, Dublin (IR); Mofeyifoluwa Olaoluwa Oluwalana, San Francisco, CA (US); Shobana Ranganathan, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 8 days.

(21) Appl. No.: 18/530,026

(22) Filed: Dec. 5, 2023

(65) Prior Publication Data

US 2025/0086212 A1 Mar. 13, 2025

Related U.S. Application Data

(60) Provisional application No. 63/537,434, filed on Sep. 8, 2023.

(51) Int. Cl.
*G06F 16/33* (2025.01)
*G06F 16/334* (2025.01)
*G06N 20/00* (2019.01)

(52) U.S. Cl.
CPC ......... *G06F 16/3344* (2019.01); *G06N 20/00* (2019.01)

(58) Field of Classification Search
CPC .............................. G06F 16/334; G06N 20/00
See application file for complete search history.

(56) References Cited

U.S. PATENT DOCUMENTS

| | | | |
|---|---|---|---|
| 12,030,923 B2 * | 7/2024 | Leister | A61P 19/02 |
| 2024/0319770 A1 * | 9/2024 | Yoon | G06F 1/1652 |
| 2024/0394251 A1 * | 11/2024 | Brende | G06F 11/3409 |
| 2024/0411788 A1 * | 12/2024 | Shin | G06F 16/3344 |
| 2025/0013437 A1 * | 1/2025 | Vidan | G06F 8/33 |
| 2025/0021767 A1 * | 1/2025 | Dharnidharka | G06F 40/30 |

* cited by examiner

*Primary Examiner* — Debbie M Le
(74) *Attorney, Agent, or Firm* — Holland & Hart LLP

(57) ABSTRACT

Methods, systems, apparatuses, and computer program products are described. A system may receive, via a cloud-based platform, user input comprising a request for generation of the integration flow. The system may generate a query based on the request and a query template including one or more example integration flows and a request to generate a natural language description of the integration flow. The system may transmit the query to the LLM and may receive, from the LLM, a response including the integration flow and the natural language description. The system may extract the integration flow and the natural language description from the response. The system may perform a validation process on the integration flow based at least in part on one or more integration flow validation rules.

18 Claims, 12 Drawing Sheets

INTEGRATION FLOW GENERATION USING LARGE LANGUAGE MODELS

CROSS REFERENCES

The present Application for Patent claims priority to U.S. Provisional Patent Application No. 63/537,434 by Minooei et al., entitled "INTEGRATION FLOW GENERATION USING LARGE LANGUAGE MODELS," filed on Sep. 8, 2023, assigned to the assignee hereof, and expressly incorporated by reference herein.

FIELD OF TECHNOLOGY

The present disclosure relates generally to database systems and data processing, and more specifically to integration flow generation using large language models.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud platform scenarios, the cloud platform, a server, or other device may aid in the creation of integration operations. However, such methods may be improved.

DETAILED DESCRIPTION

Figure 1:
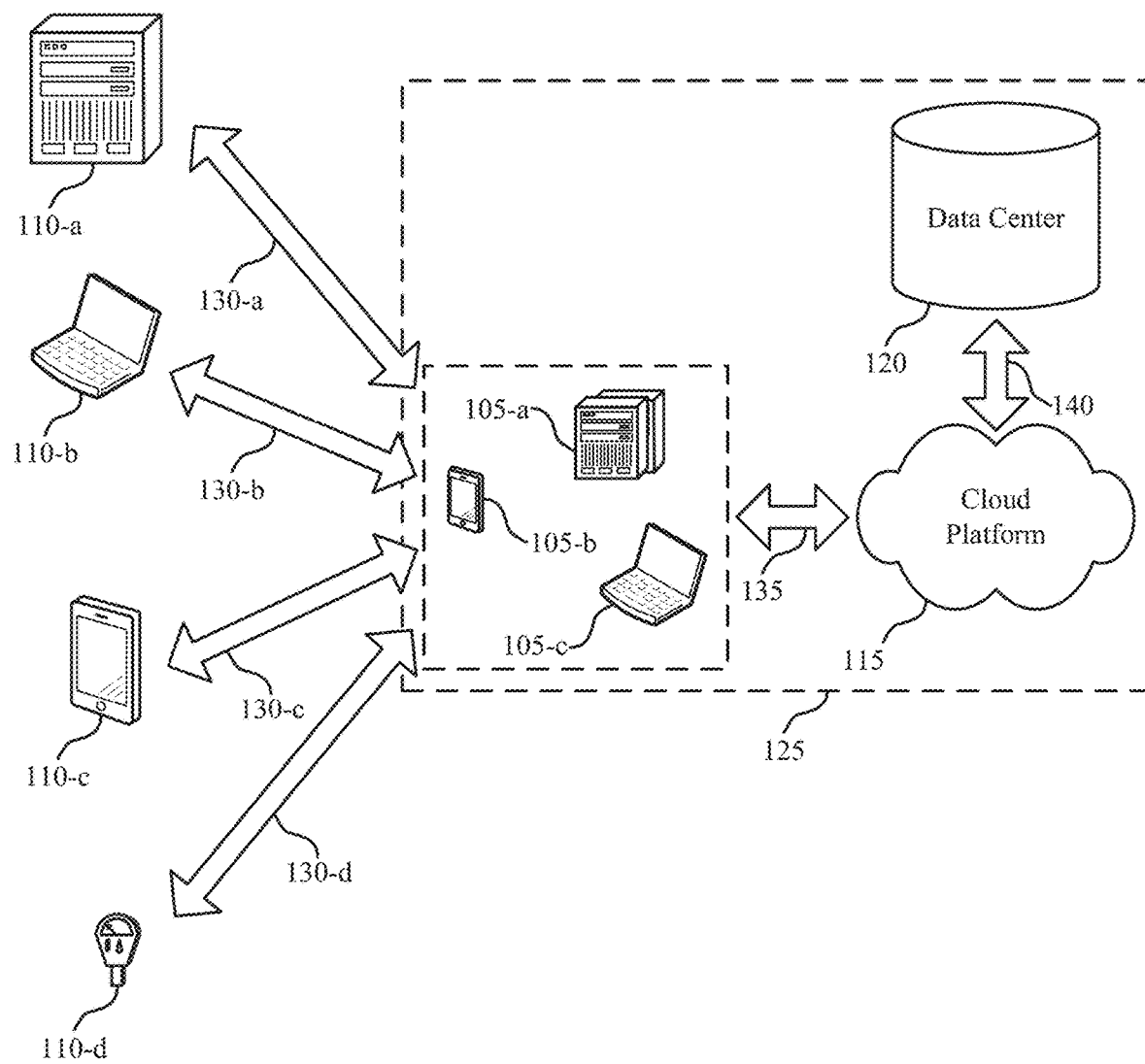
FIG. 1 illustrates an example of a generating an integration flow with a large language model (LLM) system that supports integration flow generation using large language models in accordance with examples as disclosed herein.

Developers utilizing cloud-based platforms often design, develop, and deploy application programming interfaces (APIs), integrations, and automations, such as integration flows. In some approaches, automated code builders may assist developers to develop such APIs, integrations, and automations. However, because of the complexity of the runtime environments and development languages (e.g., extensible markup language (XML), open API specification (OAS), RESTful API modeling manguage (RAML), or other languages), it may be difficult for developers to know which actions, elements, components, or information to use to develop APIs, integrations, and automations, as well as how to implement them. This high learning curve may result in time-intensive developmental overheads before any real value is created. As such, it can involve large amounts of time to build a single application, which is inefficient and frustrating.

As such, large language models (LLMs) may be employed to generate integration flows (e.g., which may include APIs, integrations, automations, or any combination thereof). For example, an integration flow may include code that associates one or more input elements and one or more output elements via one or more integration operations in a runtime environment. A client device may transmit, to a system, a request for generation of the integration flow and may provide an initial natural language input that generally describes the desired integration flow that is to be created. The system may generate a prompt (e.g., an LLM prompt) based on the request and a prompt template. The prompt template may include one or more example integration flows (e.g., that are determined based on the request or the prompt) and a request to generate a natural language description of the integration flow (e.g., that is more easily read by a user than the integration flow itself). The system may transmit the prompt to the LLM and receive a response that includes the integration flow (e.g., one or more code snippets or blocks) as well as the natural language description of the integration flow. The system may then extract the integration flow and the natural language description and may validate the integration flow (e.g., for correct implementation of programming language syntax, compatibility with other systems or one or more elements of the system, compliance with one or more validation rules, or any combination thereof). In response to a successful validation result, the integration flow and the natural language description may be presented to the user and may be executed in a runtime environment.

In some examples, the system may extract and validate one or more integration sub-flows from the response. Such sub-flows may be associated with the integration flow (e.g., through a reference) and may be extracted and validated separately from the integration flow. In some examples, the validation of the integration flow may be performed in accordance with one or more validation rules. In some examples, the example integration flows may be selected based on a comparison between the request, the prompt, or both and a pool of example integration flows to identify the individual example integration flows to be included in the prompt.

In this way, the resulting integration flows may be generated more quickly, with increased quality, reduced errors, and reduced development overhead. Further, such generated integration flows may also provide training data for which custom or locally-hosted LLMs may be trained to further improve accuracy of the generated integration flows.

Aspects of the disclosure are initially described in the context of an environment supporting an on-demand database service. Aspects of the disclosure are then described with reference to a system, a generation scheme, a prompt augmentation scheme, a processing and validation scheme, and a process flow: Aspects of the disclosure are further illustrated by and described with reference to apparatus diagrams, system diagrams, and flowcharts that relate to integration flow generation using large language models.

FIG. 1 illustrates an example of a system 100 for cloud computing that supports integration flow generation using large language models in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

For example, a cloud client 105 may transmit user input to the cloud platform 115 to initiate creation of an integration flow. The user input may include a request to generate an integration flow. The cloud platform 115 may generate a prompt that the LLM may use to generate a response that may include the integration flow. The cloud platform 115 may utilize a prompt template to provide additional information to aid in grounding the prompt so that the information sent to the LLM may be interpreted more correctly and the output integration flow and natural language description of the integration flow may be more accurate and helpful. The could platform 115 may transmit the prompt to the LLM (which may be an LLM hosted within or associated with the cloud platform or may be an LLM external to the cloud platform 115) and the LLM may respond with one or more responses that may include the integration flow (e.g., that may include one or more integration sub-flows) and the natural language description of the integration flow. The cloud platform 115 may extract the integration flow (e.g., that may include one or more integration sub-flows) and the natural language description from the response. The cloud platform 115 may further validate the integration flow to ensure compliance with programming syntax, runtime environment compatibility, compliance with one or more validation rules, or any combination thereof. In some approaches, code and programming language used for creation of APIs, integrations, and automations may be powerful, but may also be very complicated, which may result in increased development time (e.g., especially for those unfamiliar with such work). Further, troubleshooting and debugging of such code is cumbersome, difficult, and time consuming. Some approaches may employ the use of LLMs in attempts to reduce such complexities, but may fall short. For example, some approaches to code generation using LLMs do not account for the particular requests that a user may make. For example, a general LLM may be overly broad and may lack some information that may be useful for generating the responses requested by the user. Further, the responses provided by such LLMs may not be formatted correctly (e.g., for additional processing by a system) or may not include types of information or metadata that would otherwise improve the quality and accuracy of the responses provided by the LLM and the resulting code derived therefrom. For example, the output of the LLM may include the code for the integration flow and the natural language description, but may not be suitable for further processing (e.g., validation or execution in a runtime environment).

As such, a system may leverage an LLM that may grounding information, instructions, or processes that increase the accuracy of the LLMs and provide outputs that are more suited to the requests made by users. Such grounding information is included in the prompt that is sent to the LLM so that the LLM, despite perhaps lacking some domain-specific information, may provide responses that better match the user's inputs. Further, the integration flow and the natural language description may be extracted from the response to allow for further processing, validation, and execution in a runtime environment.

For example, a user may provide a request to a system, requesting generation of an integration flow. The user may designate or identify desired characteristics of the integration flow, such as desired input elements, output elements, one or more processing tasks to be performed on information retrieved from input elements, transmission of such information to the output elements, or any combination thereof. The system may generate a prompt that may include or may be based on a prompt template that may provide example integration flows to aid in grounding the prompt or the LLM to aid in increased accuracy, compliance with programming syntax, compatibility, compliance with validation rules, or any combination thereof. The prompt or prompt template may include a request to generate a natural language description of the integration flow. The system may transmit the prompt to the LLM and receive the response from the LLM. The system may then extract the integration flow and the natural language description and may validate the integration flow. In response to successful validation, the system may present the integration flow and the natural language description to the user, and may (e.g., in response to additional user input) execute the integration flow in a runtime environment.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
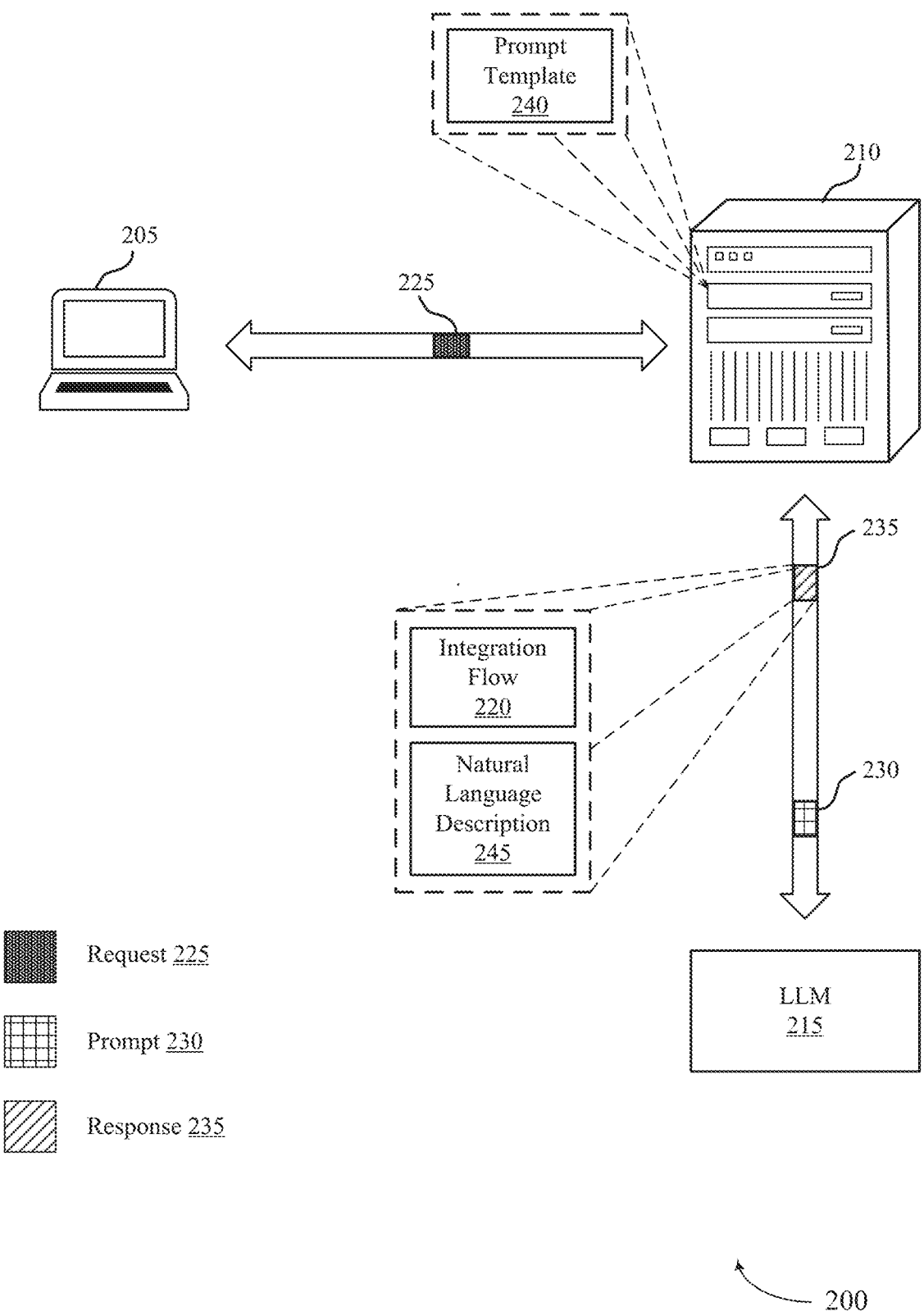
FIG. 2 shows an example of a system that supports integration flow generation using large language models in accordance with examples as disclosed herein.

FIG. 2 shows an example of a system 200 that supports integration flow generation using large language models in accordance with examples as disclosed herein. The system 200 may include a client 205, a server 210, and an LLM 215.

The LLM 215 may be hosted locally on the server 210 or within the same system (e.g., a cloud-based platform) as the server 210. Additionally, or alternatively. The LLM 215 may be hosted elsewhere and may be accessed by the server 210. The server 210 depicted here may represent one or more servers that may function in concert (e.g., in a distributed processing environment or a cloud-based platform). For example, the server 210 may form part of a cloud-based platform.

In some examples, the client 205 may transmit the request 225 to the server 210. The request 225 may include a request for the server 210 to generate the integration flow 220. The server 210 may (e.g., as part of the process of generating the prompt 230) retrieve or generate the prompt template 240 that may aid in grounding the prompt to provide additional parameters or information with which the LLM 215 may generate the responses 235. For example, the prompt template 240) may include or indicate one or more example integration flows that may provide the LLM 215 with structure, syntax, rules, formatting, or other information that may aid the LLM 215 in producing a more accurate, compatible, and compliance integration flow. In some examples, the prompt template 240 may include a request for the LLM 330 to generate a natural language description of the integration flow 220) that is to be delivered alongside the integration flow 220. The additional information included in the prompt template 240 may increase the accuracy or suitability of the responses 235 generated by the LLM 215, despite the LLM 215 being, in some cases, a broad-spectrum LLM trained on wide-ranging types of data.

The server 210 may then transmit the prompt 230 to the LLM 215 for the LLM 215 to generate the response 235. The response 235 may be generated by the LLM 215 using the information in the prompt, such as the characteristics of the integration flow 220 as a whole, instructions or information included in the prompt template 240, or any combination thereof.

The LLM 215 may transmit the response 235 to the server 210, and the server 210 may extract the integration flow 220 and the natural language description 245 for further processing of the integration flow 220, the natural language description 245, or both. For example, the server 210 may validate the integration flow to ensure compliance with programming syntax, runtime environment compatibility, compliance with one or more validation rules, or any combination thereof.

In response to a successful validation, user input, or both, the server 210 may then transmit the integration flow 220 to a runtime environment for execution of the integration flow 220. Additionally, or alternatively, the server 210 may present (e.g., via a user interface) the integration flow 220, the natural language description 245, or both, to the client 205 so that the user may verify, modify, or otherwise interact with the integration flow 220, the natural language description 245, or both.

Figure 3:
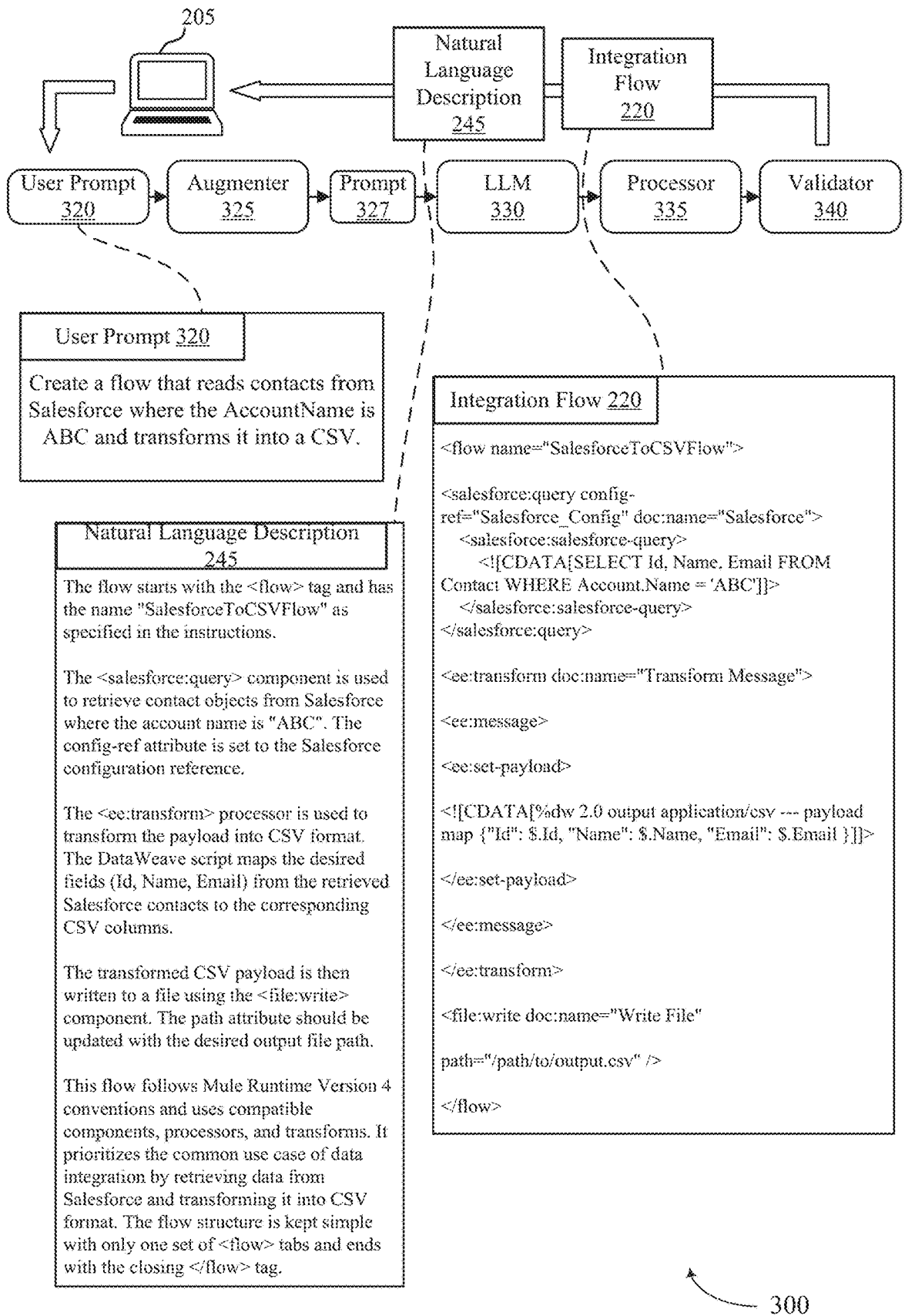
FIG. 3 shows an example of a generation scheme that supports integration flow generation using large language models in accordance with examples as disclosed herein.

FIG. 3 shows an example of a generation scheme 300 that supports integration flow generation using large language models in accordance with examples as disclosed herein. The generation scheme 300 may involve a client 205, a user prompt 320, an augmenter 325, an LLM 330, a processor 335, and a validator 340. The generation scheme 300 may illustrate a framework or method for generating the integration flow 220 and the natural language description 245 of the integration flow 220. In some examples, the client 205 may be associated with a client identifier, which may be referred to at various portions of the generation scheme 300 to coordinate the creation of the integration flow 220. Additionally, or alternatively, a session initiated by the client may be associated with a session identifier that may be referred to at various portions of the generation scheme 300 to coordinate the creation of the integration flow 220.

The user prompt 320 may include a user expectation or request for generation of the integration flow 220, the natural language description 245, or both. For example, a user prompt may include instructions for creating the integration flow 220 and may designate one or more input elements, one or more output elements, one or more operations or processing tasks (e.g., that receive an input element or information therefrom, process the element or information, and pass the processed information to an output element or create the output element and transmit the output element). The user prompt 320 may include a user-provided description (e.g., in a natural language format, a structured data format, or other format) of the desired integration flow 220 that is to be generated.

The user prompt 320 may be passed to the augmenter 325, which may design one or more aspects of the prompt 327 that is to be transmitted to the LLM 330, tune the prompt 327, include additional instructions or information within the prompt 327 for the LLM 330 to utilized (e.g., to ground the input or the LLM 330 to produce results with increased accuracy), or any combination thereof. For example, the augmenter 325 may receive the user prompt 320 and may generate the prompt 327 based on the user prompt 320 and a prompt template (e.g., that may include one or more example integration flows and a request to generate the natural language description 245). Such example integration flows may be locally-stored examples, documentation examples, or other examples from other data sources. In some examples, the augmenter 325 may select the prompt template (e.g., including the instructions, example integration flows, other included information, or any combination thereof) based on a runtime version that is to be used to run the integration flow 220. For example, In some examples, the augmenter 325 may dynamically select which examples to use based on relevant actions or similar prompts. For example, the augmenter 325 may employ an action encoder that identifies the relevant actions or components to use as part of the integration flow 220. For instance, if the user prompt was to "generate a flow that reads opportunity objects from Salesforce where the Amount is greater than 10K and transforms it into a CSV", the action encode may identify that a Salesforce query is most pertinent and will attach an example that uses that query. In some examples, the augmenter 325 may employ a prompt similarity approach in which the augmenter 325 identifies other prompts in an internal repository of prompts that are similar to the user prompt 320 or a predicted prompt generated based on the user prompt 320. The augmenter 325 may then include the example integration flow corresponding to the found similar prompt in the prompt 327. To use the same example of a user prompt 320 reading "generate a flow that reads opportunity objects from Salesforce where the Amount is greater than 10K and transforms it into a CSV", the augmenter 325 may recognizes that a similar prompt in a repository is to "create a flow that fetches contacts" and the augmenter 325 may therefore attach the corresponding example integration flow for the contact fetching prompt to the prompt 327 generated based on the user prompt 320. In some examples, before adding a candidate example to the prompt 327, the augmenter 325 may verify that there are sufficient tokens or sufficient "space" in the prompt 327 to include the candidate example. Additionally, or alternatively, the augmenter 325 may verify that the candidate example has not already been added to the prompt 327 to avoid duplication of example integration flows.

The LLM 330 may receive the prompt 327 and may generate a response based on the prompt 327, or one or more elements included therein. In some examples, the LLM 330 may be a publicly-accessible LLM or an externally-hosted LLM (e.g., outside of a cloud platform in which the server 210, the client 205, or both, may operate). However, in some examples, the LLM 330 may be hosted within such a cloud platform or otherwise be associated with the server 210, the client 205, or any combination thereof. In such cases, the LLM 330 may be trained using information associated with the cloud platform. For example, the LLM 330 may be trained on feedback data associated with prior generation events that produced integration flows. For example, the LLM 330 may be trained for a particular client, organization, industry, or other classification to provide characteristics of the output data objects (e.g., surveys) that may be more suited for the particular client, organization, or industry. Further, as more and more integration flows 220 and natural language descriptions 245 (e.g., surveys) are created and corresponding feedback is collected (e.g., relevancy feedback, accuracy feedback, or other feedback), the training data may be improved by including domain-specific information along with positively-received and negatively-received examples of elements of such integration flows 220 and natural language descriptions 245. Further, one or more prompt templates may be created or modified for different clients, organizations, industries, or other classifications and such prompt templates may be modified based on the received feedback. In some examples, feedback for creating prompt templates, training the LLM 330, or both, may include acceptance metrics, frequency of use metrics, used/unused metrics, deployment location metrics, like/dislike metrics. In some examples, such information may be siloed or divided as to avoid contamination or leakage of information between different clients or users of a cloud platform performing the operations described herein. Further, in some examples, the LLM 330 may be trained on existing client data or information collected from other sources.

The processor 335 may engage in post processing of the response received from the LLM 330 or information included in the response. For example, the processor 335 may extract the integration flow 220 and the natural language description 245 from the response for further processing (e.g., validation of the integration flow 220 with the validator 340, presentation of the integration flow 220, the natural language description 245, or both to the client 205 via a user interface, or other processing). For example, the processor 335 may intake raw responses from the LLM 330 and may extract or separate the response into the integration flow 220 (e.g., which may be an XML code sample or snippet) for validation and the natural language description 245 that may be presented to the client 205 (e.g., based on a successful validation of the integration flow 220).

The validator 340 may validate the separated or extracted integration flow 220 to verify whether the integration flow 220 include valid code, does not include prohibited components, operations, connections, or information, complies with one or more policies (e.g., security or data handling policies), or any combination thereof. In some cases, the LLM 330 may not generate a satisfactory integration flow 220 (e.g., the validation returns a failure result). In such cases, the system may instead provide a template integration flow to the client 205 that may be modified manually by a user.

Figure 4:
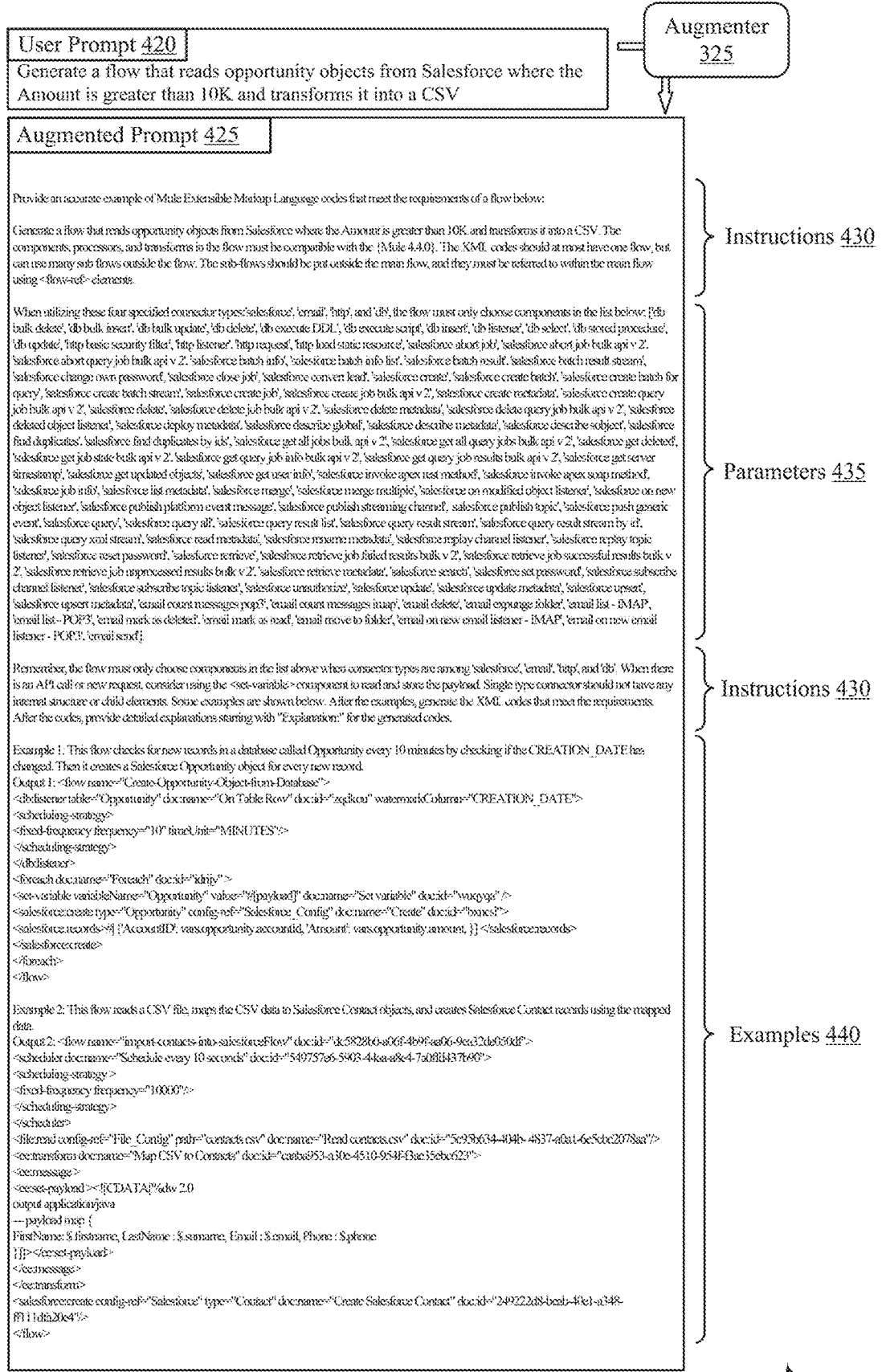
FIG. 4 shows an example of a prompt augmentation scheme that supports integration flow generation using large language models in accordance with examples as disclosed herein.

FIG. 4 shows an example of a prompt augmentation scheme 400 that supports integration flow generation using large language models in accordance with examples as disclosed herein. The prompt augmentation scheme 400 depicts an example user prompt 420 that is augmented or modified to produce the augmented prompt 425 that is to be transmitted to an LLM to generate an integration flow. As described herein, the augmenter 325 may receive the user prompt 420 and include instructions 430, parameters 435, and examples 440 (e.g., example integration flows or other examples) to aid the LLM in generating more accurate and useful integration flows that comply with syntax rules, organizational policies, one or more other considerations, or any combination thereof.

For example, the augmenter 325 may include the instructions 430 that may provide additional directives and guidelines to the LLM for generating the integration flow. In some examples, the instructions 430 may include an indication of a version of a runtime engine or environment to support compatibility of the integration flow with the runtime engine or environment. In some examples, the instructions 430 may include one or more quantities of integration flows, integration sub-flows, or both that are to be generated (e.g., one or more thresholds that are not to be exceeded). The instructions 430 may include instructions to associate any integration sub-flows with one or more integration flows and may indicate a mechanism for doing so. The instructions 430 may include a directive to limit the use of available elements (e.g., components, connectors, operations, integration flow structures, databases, other information, or any combination thereof) to those parameters 435 indicated in the augmented prompt 425 (e.g., to avoid the use of unknown elements in the integration flow). The instructions 430 may include one or more optional or suggested elements (e.g., connectors, operations, functions, databases, or other information). The instructions 430 may include one or more directives for the LLM to generate one or more natural language descriptions of the integration flow that may be presented to the client or user.

In some examples, the instructions 430 may be determined, selected, or generated based on chain of thoughts techniques. For example, instead of simply providing a desired outcome, the instructions 430 may provide intermediate reasoning steps, which may improve the ability of the LLM to perform complex reasoning and increase accuracy of the resulting integration flow, natural language description, or both.

In some examples, the parameters 435 may include one or more parameters (e.g., connectors, operations, functions, integration flow structures, databases, other information, or any combination thereof) that the LLM may include in the integration flow. The parameters 435 may include a set of allowed parameters to be used (e.g., a whitelist), a set of disallowed parameters (e.g., a blacklist), or both. The parameters 435 may include one or more required parameters, one or more optional parameters, or any combination thereof. In some examples, the parameters 435 may include one or more tuning parameters that are applied to one or more hyperparameters, such as temperature parameters, a quantity of generations parameters, a maximum or minimum response token length, or any combination thereof.

The examples 440 may include one or more example integration flows that may illustrate one or more of the instructions 430, parameters 435, other information, or any combination thereof. The examples 440 may include a single example or multiple examples, which may be selected through identification of relevant parameters (e.g., actions, operations, or other processes), through a similarity comparison of the prompt 420 and a repository of sample prompts associated with a pool of example integration flows (e.g., as described herein). In some examples, the augmenter 325 may utilize multiple techniques for identifying and adding such examples 440) into the augmented prompt 425.

For example, the augmenter 325 may search for similar actions as those identified or implied based on the user prompt 420 and may do so using a bi-encoder, a cross-encoder, or any combination thereof. Further the augmenter 325 may identify such similar actions using an action tag, which may include a code snippet that may indicate or implement one or more operations within the integration flow. Additionally, or alternatively, the augmenter 325 may include an example that includes the identified one or more actions that are similar to those identified or implied in the user prompt 420.

In some further examples, the augmenter 325 may employ a prompt-to-prompt comparison between the user prompt 420 and a set of example prompts each associated with one or more example integration flows. If the comparison between the user prompt 420) and an example prompt results in a score that satisfies a comparison similarity threshold, the augmenter 325 may flag or mark the example for inclusion in the examples 440 of the augmented prompt 425 and may subsequently include the example in the examples 440 of the augmented prompt 425. The augmenter 325 may perform such prompt-to-prompt comparison using a bi-encoder, a cross-encoder, a fine-tuned model (e.g., trained or tuned using example positive result comparisons, example negative result comparisons, or any combination thereof. The bi-encoder may include the use of a cosine-similarity comparison, one or more pooling operations, a bi-directional encoder representation from transformations (BERT) operations, or any combination thereof. The cross-encoding operations or techniques may include one or more BERT operations and a classifier operation.

In some examples, the augmenter 325 may determine a quantity of examples to include in the examples 440. For example, the augmenter 325 may employ a static shots strategy (e.g., which may involve a fixed or determined quantity of examples that are to be used). Additionally, or alternatively, the augmenter 325 the employ a dynamic shots strategy in which the augmenter 325 determines an amount or quantity of available tokens or "space" of the augmented prompt 425 in which the examples 440 may be included. In some examples, the augmenter 325 may determine a balance between the effectiveness of including additional examples 440 and a processing time that may be increased as additional examples 440 are included in the 425. Such a determination may be made based on effectiveness metrics associated with previously-generated integration flows, latency metrics associated with previously-generated integration flows, other metric information, or any combination thereof.

Figure 5:
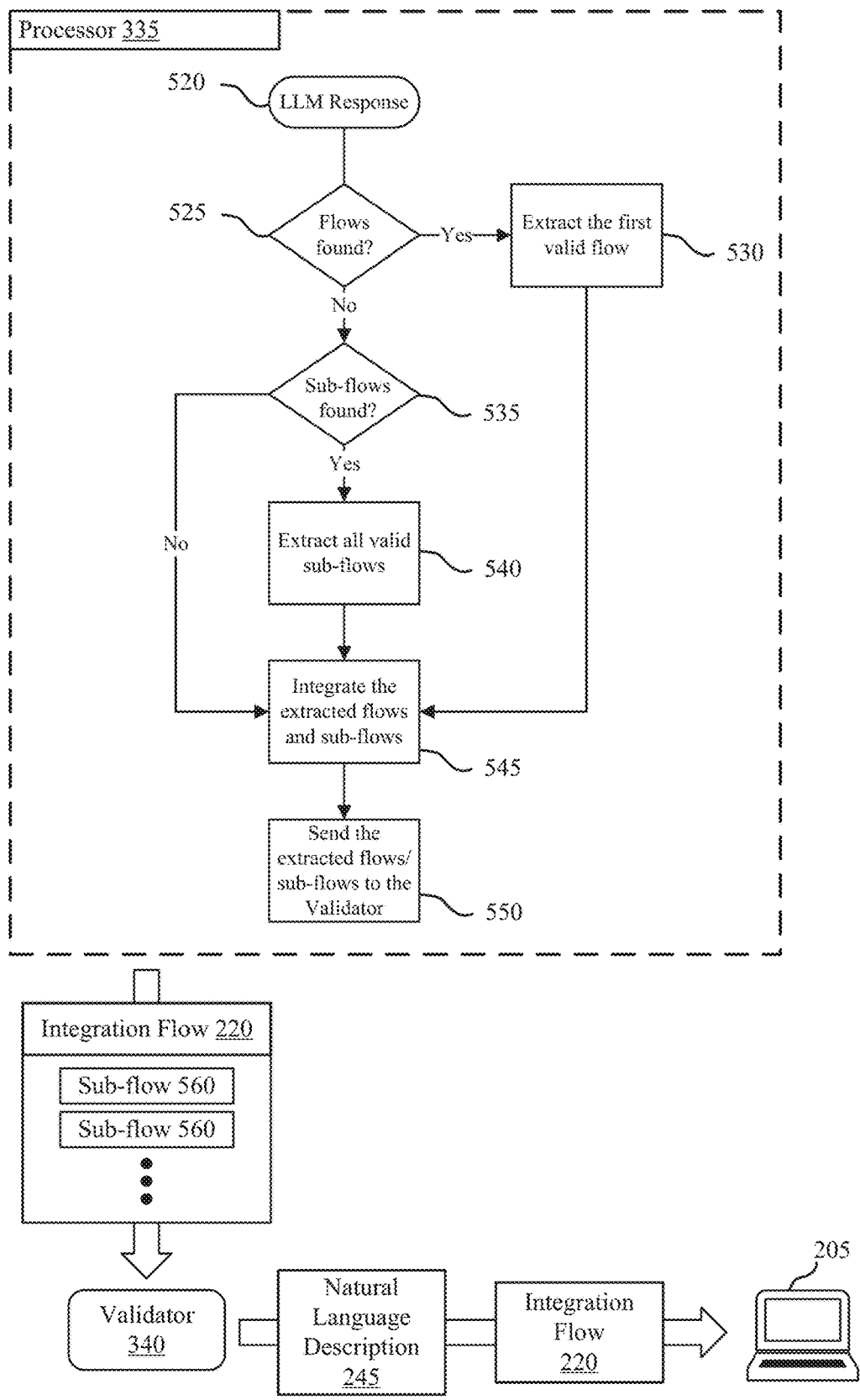
FIG. 5 shows an example of a processing and validation scheme that supports integration flow generation using large language models in accordance with examples as disclosed herein.

FIG. 5 shows an example of a processing and validation scheme 500 that supports integration flow generation using large language models in accordance with examples as disclosed herein.

The processing and validation scheme 500 depicts the processor 335 and the validator 340. The processor 335 may extract the integration flow 220, one or more sub-flows 560, the natural language description 245, or any combination thereof from the response received from the LLM.

For example, at 520, the processor 335 may receive the response. At 525, the processor 335 may determine whether there are any flows found in the response. If so, operation continues to element 530, in which the processor 335 extracts the first valid flow found in the response and subsequently continues to element 545. However, if no flows are found in the response, the processor continues to element 535, in which the processor 335 determines whether any sub-flows are found in the response. If so, operation continues to element 540 in which the processor 335 extracts all valid sub-flows. If, at element 535, no sub-flows are found, the processor 335 continues to element 545. At element 545, the processor 335 integrates the found integration flow, the one or more sub-flows, or any combination thereof and proceeds, at element 550, to transmit the integration flow 220 (optionally including the one or more sub-flows 560) to the validator 340.

As described herein, the validator 340 may validate the integration flow 220, the one or more sub-flows 560, or any combination thereof, to determine whether the integration flow 220, the one or more sub-flows 560, or any combination thereof include valid code, comply with one or more organizational policies, comply with the instructions 430, the parameters 435, the examples 440, or any combination thereof, comply with one or more validation rules, or any combination thereof.

Figure 6:
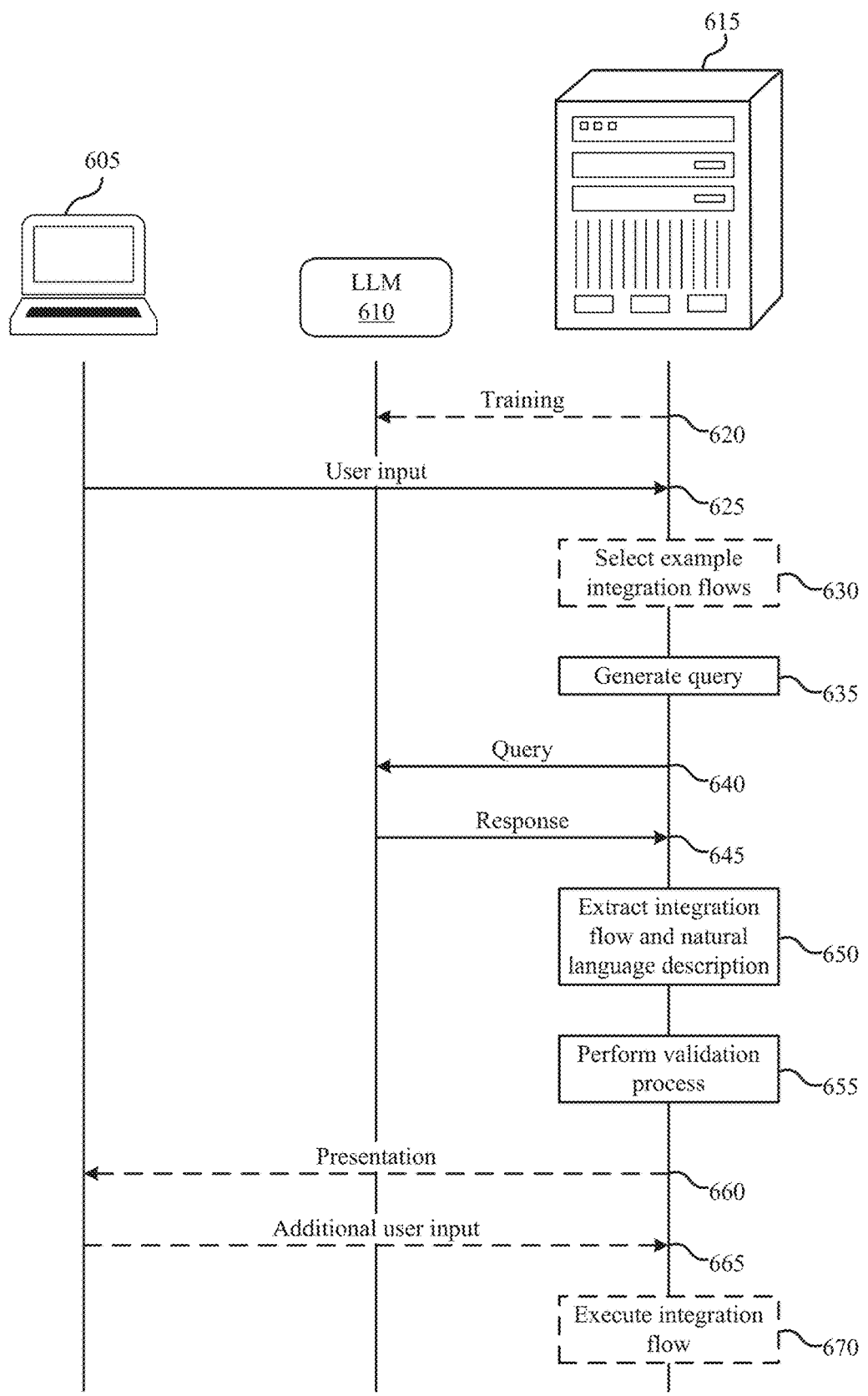
FIG. 6 shows an example of a process flow that supports integration flow generation using large language models in accordance with examples as disclosed herein.

FIG. 6 shows an example of a process flow 600 that supports integration flow generation using large language models in accordance with examples as disclosed herein.

The process flow 600 may implement various aspects of the present disclosure described herein. The elements described in the process flow 600 (e.g., server 615, LLM 610, and client 605) may be examples of similarly named elements described herein.

In the following description of the process flow 600, the operations between the various entities or elements may be performed in different orders or at different times. Some operations may also be left out of the process flow 600, or other operations may be added. Although the various entities or elements are shown performing the operations of the process flow 600, some aspects of some operations may also be performed by other entities or elements of the process flow 600 or by entities or elements that are not depicted in the process flow, or any combination thereof.

At 620, the server 615 may train the LLM 610 based on one or more prior queries, an acceptance metric associated with the one or more prior queries, a usage metric associated with the one or more prior queries, feedback associated with the one or more prior queries, or any combination thereof.

At 625, the server 615 may receive, via a cloud-based platform, user input (e.g., from the client 605) that may include a request for generation of the integration flow. In some examples, the integration flow may include code that associates one or more input elements and one or more output elements via one or more integration operations in a runtime environment. In some examples, the request for generation of the integration flow may include natural language input that indicates one or more characteristics of the integration flow.

At 630, the server 615 may select the one or more example integration flows from a plurality of example integration flows based on one or more first integration operations indicated in the query, the one or more example integration flows, or both, one or more actions identified in the query, one or more data processing components identified in the query, a similarity analysis between the query and one or more example queries associated with the plurality of example integration flows, or any combination thereof.

At 635, the server 615 may generate a query based on the request and a query template indicating one or more example integration flows and that may include a request to generate a natural language description of the integration flow. In some examples, the query indicates the one or more input elements, the one or more output elements, one or more criteria associated with the one or more input elements, one or more criteria associated with the one or more output elements, or any combination thereof. In some examples, the query template may indicate one or more connector types permitted to be included in the integration flow, one or more integration flow components permitted to be included in the integration flow, or any combination thereof. In some examples, the query template may indicate a runtime engine with which the integration flow is to be compatible.

At 640, the server 615 may transmit the query to the LLM 610.

At 645, the server 615 may receive, from the LLM 610, a response that may include the integration flow and the natural language description.

At 650, the server 615 may extract the integration flow and the natural language description from the response. In some examples, extracting the integration flow and the natural language description from the response may include identifying one or more integration sub-flows associated with the integration flow and extracting the one or more integration sub-flows At 655, the server 615 may perform a validation process on the integration flow based on one or more integration flow validation rules. In some examples, validating the integration flow may include validating the one or more integration sub-flows. In some examples, the one or more integration flow validation rules comprise one or more indications of one or more programming languages, one or more programming language syntax rules, one or more markup languages, one or more markup language syntax rules, one or more permitted integration flow elements, one or more permitted runtime engines with which the integration flow is to be compatible, one or more predicted results of one or more integration operations indicated in the query, one or more organizational policies, or any combination thereof.

At 660, the server 615 may present, based on a positive validation result resulting from the validation process, the integration flow and the natural language description of the integration flow via a user interface.

At 665, the server 615 may receive additional user input that may include an instruction to execute the integration flow in a runtime environment. Additionally, or alternatively, the additional user input may indicate one or more modifications to be made to the integration flow (e.g., before executing the integration flow). In some examples, the server 615 may transmit an updated integration flow (e.g., a modified integration flow or a newly-generated integration flow that has been generated based on the one or more modifications).

At 670, the server 615 may execute the integration flow in the runtime environment based on the additional user input.

Figure 7:
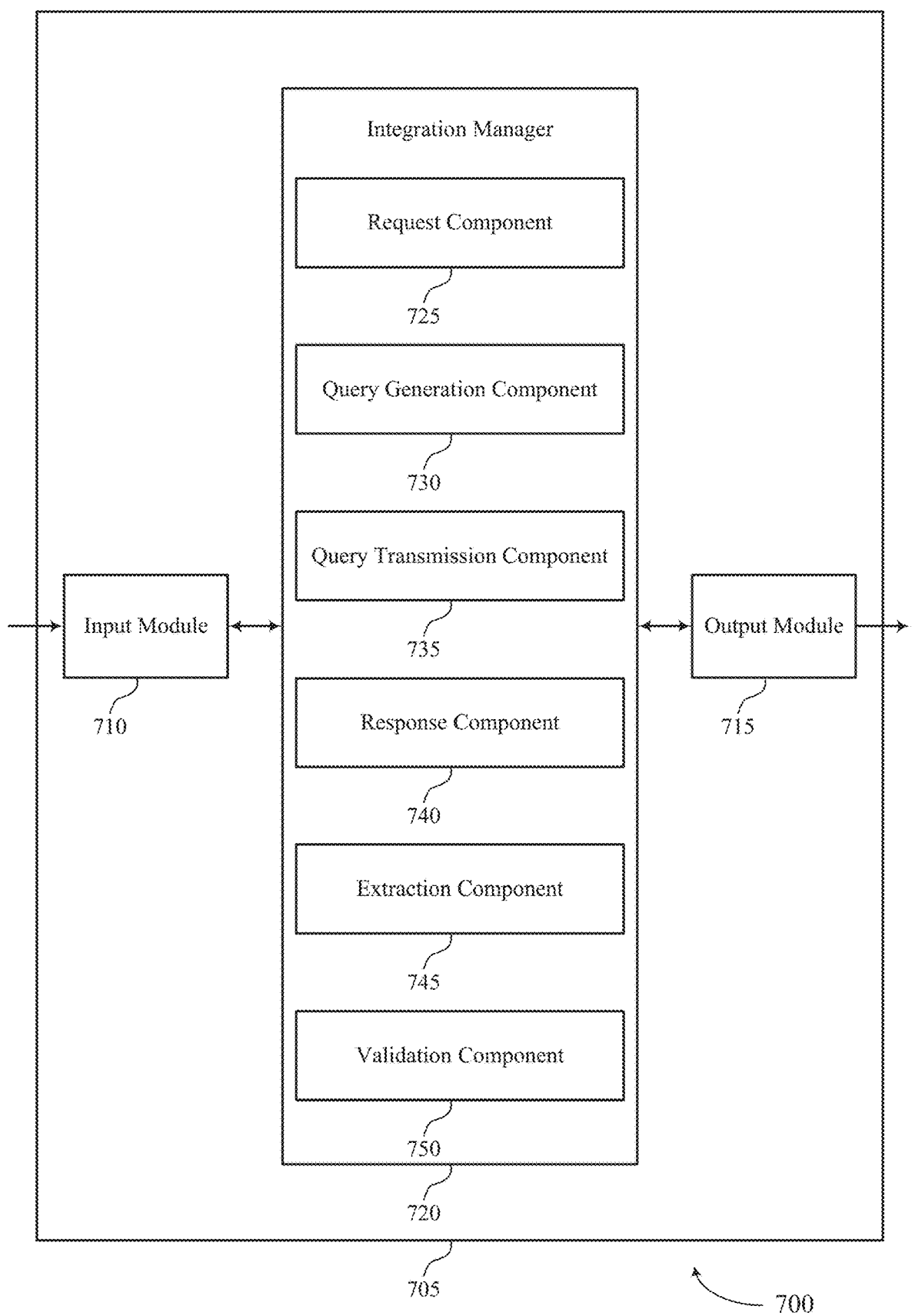
FIG. 7 shows a block diagram of an apparatus that supports integration flow generation using large language models in accordance with examples as disclosed herein.

FIG. 7 shows a block diagram 700 of a device 705 that supports integration flow generation using large language models in accordance with examples as disclosed herein. The device 705 may include an input module 710, an output module 715, and an integration manager 720. The device 705, or one or more components of the device 705 (e.g., the input module 710, the output module 715, and the integration manager 720), may include at least one processor, which may be coupled with at least one memory, to support the described techniques. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOSR, ANDROIDR, MS-DOS®, MS-WINDOWS®, OS/2R, UNIXR, LINUXR, or another known operating system to handle input signals. The input module 710 may send aspects of these input signals to other components of the device 705 for processing. For example, the input module 710 may transmit input signals to the integration manager 720 to support integration flow generation using large language models. In some cases, the input module 710 may be a component of an input/output (I/O) controller 910 as described with reference to FIG. 9.

The output module 715 may manage output signals for the device 705. For example, the output module 715 may receive signals from other components of the device 705, such as the integration manager 720, and may transmit these signals to other components or devices. In some examples, the output module 715 may transmit output signals for display in a user interface, for storage in a database or data store, for further processing at a server or server cluster, or for any other processes at any quantity of devices or systems. In some cases, the output module 715 may be a component of an I/O controller 910 as described with reference to FIG. 9.

For example, the integration manager 720 may include a request component 725, a query generation component 730, a query transmission component 735, a response component 740, an extraction component 745, a validation component 750, or any combination thereof. In some examples, the integration manager 720, or various components thereof, may be configured to perform various operations (e.g., receiving, monitoring, transmitting) using or otherwise in cooperation with the input module 710, the output module 715, or both. For example, the integration manager 720 may receive information from the input module 710, send information to the output module 715, or be integrated in combination with the input module 710, the output module 715, or both to receive information, transmit information, or perform various other operations as described herein.

The integration manager 720 may support generating an integration flow with a large language model (LLM) in accordance with examples as disclosed herein. The request component 725 may be configured to support receiving, via a cloud-based platform, user input including a request for generation of the integration flow. The query generation component 730 may be configured to support generating a query based on the request and a query template indicating one or more example integration flows and including a request to generate a natural language description of the integration flow. The query transmission component 735 may be configured to support transmitting the query to the LLM. The response component 740 may be configured to support receiving, from the LLM, a response including the integration flow and the natural language description. The extraction component 745 may be configured to support extracting the integration flow and the natural language description from the response. The validation component 750 may be configured to support performing a validation process on the integration flow based on one or more integration flow validation rules.

Figure 8:
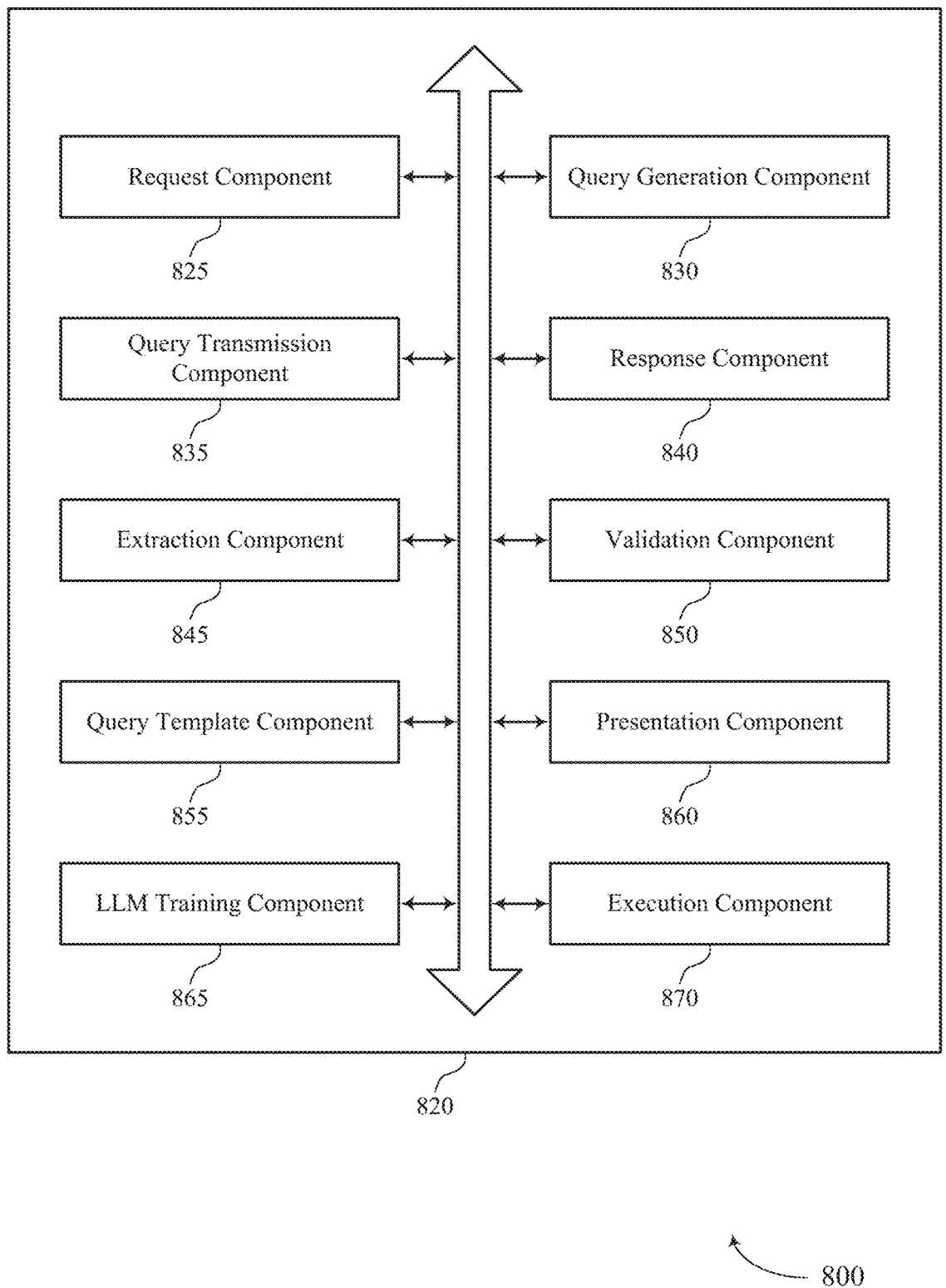
FIG. 8 shows a block diagram of an integration manager that supports integration flow generation using large language models in accordance with examples as disclosed herein.

FIG. 8 shows a block diagram 800 of an integration manager 820 that supports integration flow generation using large language models in accordance with examples as disclosed herein. The integration manager 820 may be an example of aspects of an integration manager or an integration manager 720, or both, as described herein. The integration manager 820, or various components thereof, may be an example of means for performing various aspects of integration flow generation using large language models as described herein. For example, the integration manager 820 may include a request component 825, a query generation component 830, a query transmission component 835, a response component 840, an extraction component 845, a validation component 850, a query template component 855, a presentation component 860, an LLM training component 865, an execution component 870, or any combination thereof. Each of these components, or components of sub-components thereof (e.g., one or more processors, one or more memories), may communicate, directly or indirectly, with one another (e.g., via one or more buses).

The integration manager 820 may support generating an integration flow with a large language model (LLM) in accordance with examples as disclosed herein. The request component 825 may be configured to support receiving, via a cloud-based platform, user input including a request for generation of the integration flow. The query generation component 830 may be configured to support generating a query based on the request and a query template indicating one or more example integration flows and including a request to generate a natural language description of the integration flow. The query transmission component 835 may be configured to support transmitting the query to the LLM. The response component 840 may be configured to support receiving, from the LLM, a response including the integration flow and the natural language description. The extraction component 845 may be configured to support extracting the integration flow and the natural language description from the response. The validation component 850 may be configured to support performing a validation process on the integration flow based on one or more integration flow validation rules.

In some examples, extracting the integration flow and the natural language description from the response includes identifying one or more integration sub-flows associated with the integration flow and extracting the one or more integration sub-flows. In some examples, validating the integration flow includes validating the one or more integration sub-flows.

In some examples, the one or more integration flow validation rules include one or more indications of one or more programming languages, one or more programming language syntax rules, one or more markup languages, one or more markup language syntax rules, one or more permitted integration flow elements, one or more permitted runtime engines with which the integration flow is to be compatible, one or more predicted results of one or more integration operations indicated in the query, one or more organizational policies, or any combination thereof.

In some examples, the integration flow includes code that associates one or more input elements and one or more output elements via one or more integration operations in a runtime environment.

In some examples, the query indicates the one or more input elements, the one or more output elements, one or more criteria associated with the one or more input elements, one or more criteria associated with the one or more output elements, or any combination thereof.

In some examples, the query generation component 830 may be configured to support selecting the one or more example integration flows from a set of multiple example integration flows based on one or more first integration operations indicated in the query, the one or more example integration flows, or both, one or more actions identified in the query, one or more data processing components identified in the query, a similarity analysis between the query and one or more example queries associated with the set of multiple example integration flows, or any combination thereof.

In some examples, the query template indicates one or more connector types permitted to be included in the integration flow, one or more integration flow components permitted to be included in the integration flow, or any combination thereof.

In some examples, the query template indicates a runtime engine with which the integration flow is to be compatible.

In some examples, the presentation component 860 may be configured to support presenting, based on a positive validation result resulting from the validation process, the integration flow and the natural language description of the integration flow via a user interface.

In some examples, the LLM training component 865 may be configured to support training the LLM based on one or more prior queries, an acceptance metric associated with the one or more prior queries, a usage metric associated with the one or more prior queries, feedback associated with the one or more prior queries, or any combination thereof.

In some examples, the execution component 870 may be configured to support receiving additional user input including an instruction to execute the integration flow in a runtime environment. In some examples, the execution component 870 may be configured to support executing the integration flow in the runtime environment based on the additional user input.

In some examples, the request for generation of the integration flow includes natural language input that indicates one or more characteristics of the integration flow.

Figure 9:
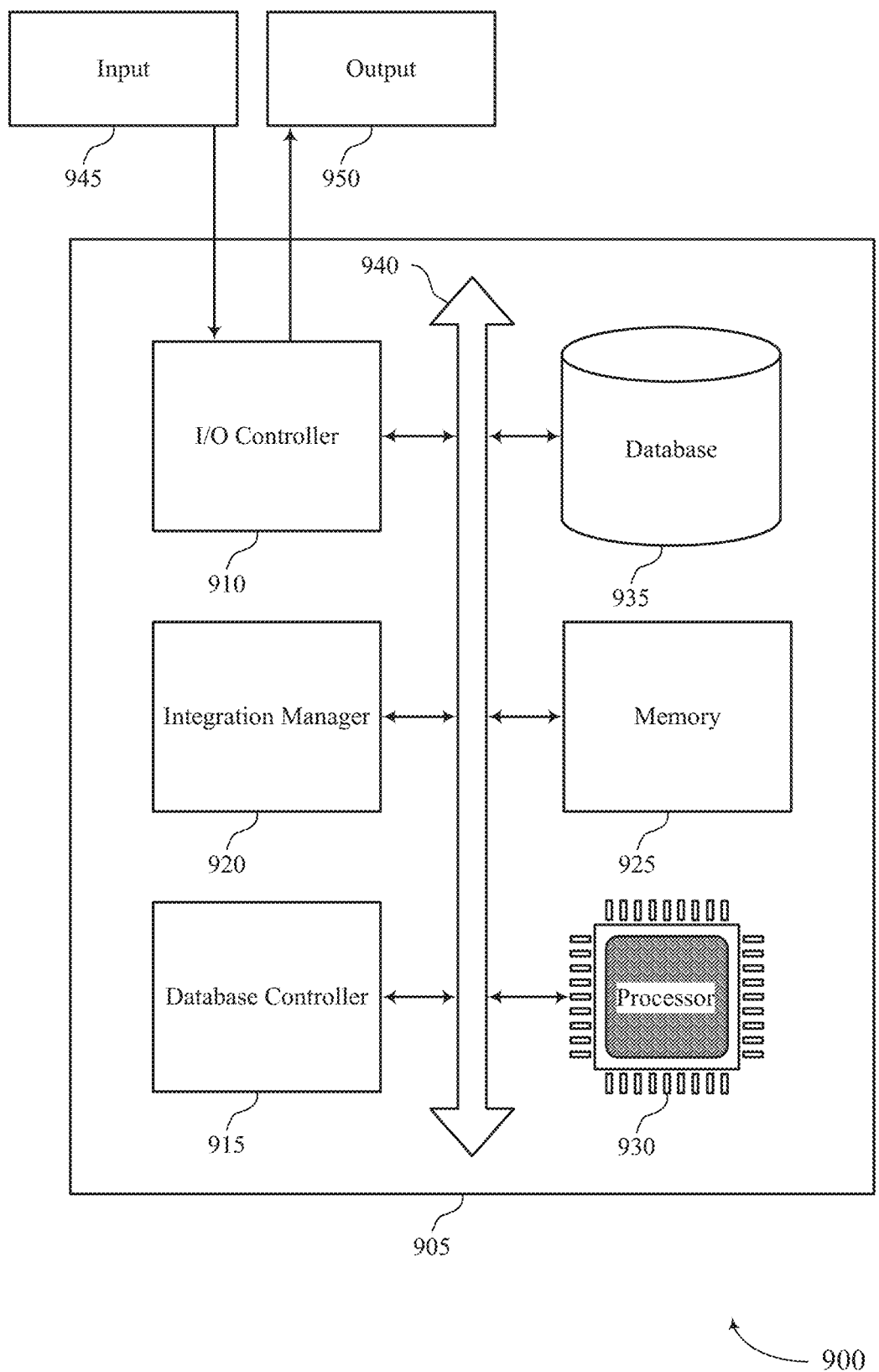
FIG. 9 shows a diagram of a system including a device that supports integration flow generation using large language models in accordance with examples as disclosed herein.

FIG. 9 shows a diagram of a system 900 including a device 905 that supports integration flow generation using large language models in accordance with examples as disclosed herein. The device 905 may be an example of or include the components of a device 705 as described herein. The device 905 may include components for bi-directional data communications including components for transmitting and receiving communications, such as an integration manager 920, an I/O controller 910, a database controller 915, at least one memory 925, at least one processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOSR, ANDROIDR, MS-DOSR, MS-WINDOWS®, OS/2R, UNIXR, LINUXR, or another known operating system. In other cases, the I/O controller 910 may represent or interact with a modem, a keyboard, a mouse, a touchscreen, or a similar device. In some cases, the I/O controller 910 may be implemented as part of a processor

930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause at least one processor 930 to perform various functions described herein. In some cases, the memory 925 may contain, among other things, a basic I/O system (BIOS) which may control basic hardware or software operation such as the interaction with peripheral components or devices. The memory 925 may be an example of a single memory or multiple memories. For example, the device 905 may include one or more memories 925.

The processor 930 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in at least one memory 925 to perform various functions (e.g., functions or tasks supporting integration flow generation using large language models). The processor 930 may be an example of a single processor or multiple processors. For example, the device 905 may include one or more processors 930.

The integration manager 920 may support generating an integration flow with a large language model (LLM) in accordance with examples as disclosed herein. For example, the integration manager 920 may be configured to support receiving, via a cloud-based platform, user input including a request for generation of the integration flow. The integration manager 920 may be configured to support generating a query based on the request and a query template indicating one or more example integration flows and including a request to generate a natural language description of the integration flow. The integration manager 920 may be configured to support transmitting the query to the LLM. The integration manager 920 may be configured to support receiving, from the LLM, a response including the integration flow and the natural language description. The integration manager 920 may be configured to support extracting the integration flow and the natural language description from the response. The integration manager 920 may be configured to support performing a validation process on the integration flow based on one or more integration flow validation rules.

By including or configuring the integration manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

Figure 10:
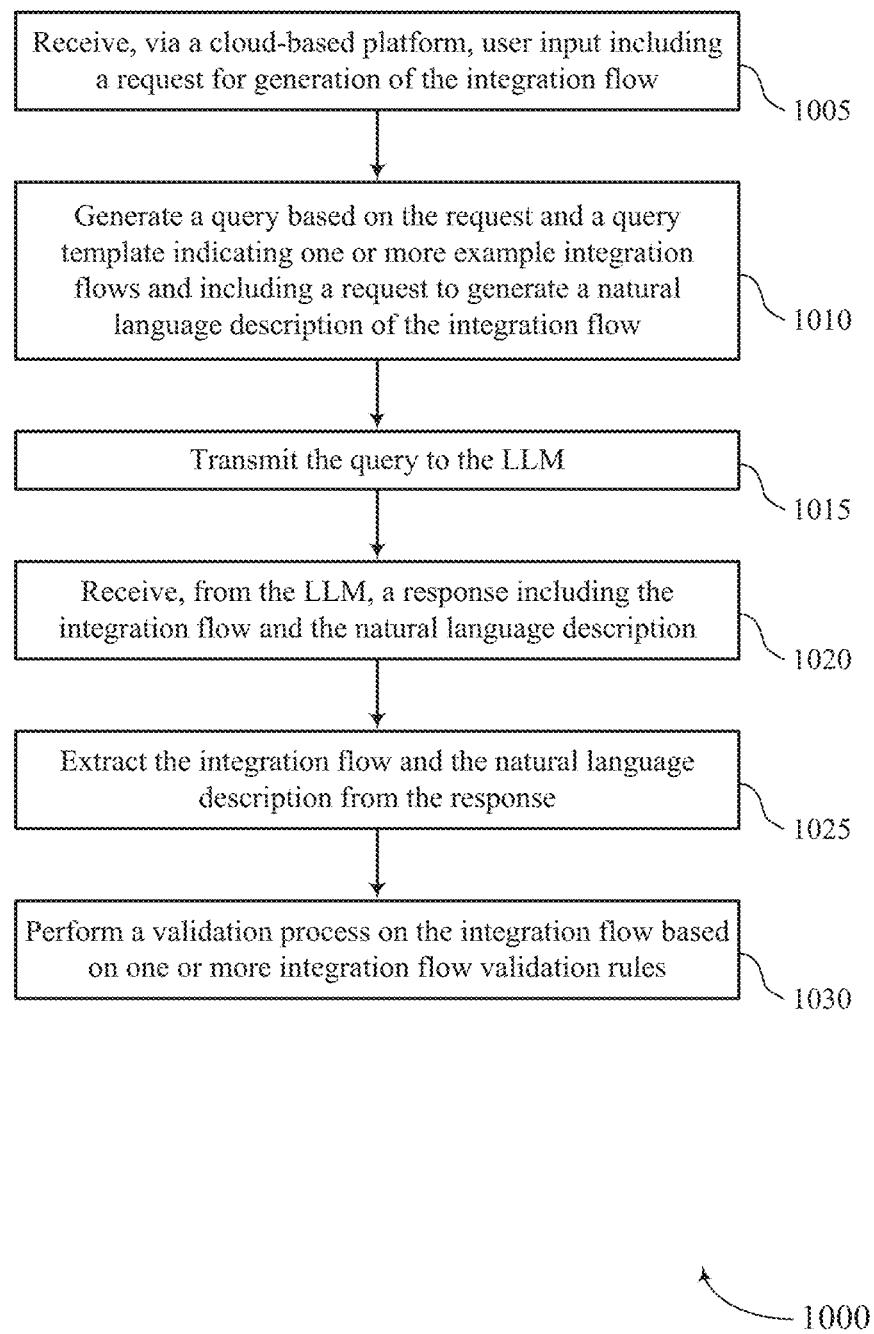
FIGS. 10 through 12 show flowcharts illustrating methods that support integration flow generation using large language models in accordance with examples as disclosed herein.

FIG. 10 shows a flowchart illustrating a method 1000 that supports integration flow generation using large language models in accordance with examples as disclosed herein. The operations of the method 1000 may be implemented by an application server or its components as described herein. For example, the operations of the method 1000 may be performed by an application server as described with reference to FIGS. 1 through 9. In some examples, an application server may execute a set of instructions to control the functional elements of the application server to perform the described functions. Additionally, or alternatively, the application server may perform aspects of the described functions using special-purpose hardware.

At 1005, the method may include receiving, via a cloud-based platform, user input including a request for generation of the integration flow. The operations of block 1005 may be performed in accordance with examples as disclosed herein. In some examples, aspects of the operations of 1005 may be performed by a request component 825 as described with reference to FIG. 8.

At 1010, the method may include generating a query based on the request and a query template indicating one or more example integration flows and including a request to generate a natural language description of the integration flow. The operations of block 1010 may be performed in accordance with examples as disclosed herein. In some examples, aspects of the operations of 1010 may be performed by a query generation component 830 as described with reference to FIG. 8.

At 1015, the method may include transmitting the query to the LLM. The operations of block 1015 may be performed in accordance with examples as disclosed herein. In some examples, aspects of the operations of 1015 may be performed by a query transmission component 835 as described with reference to FIG. 8.

At 1020, the method may include receiving, from the LLM, a response including the integration flow and the natural language description. The operations of block 1020 may be performed in accordance with examples as disclosed herein. In some examples, aspects of the operations of 1020 may be performed by a response component 840 as described with reference to FIG. 8.

At 1025, the method may include extracting the integration flow and the natural language description from the response. The operations of block 1025 may be performed in accordance with examples as disclosed herein. In some examples, aspects of the operations of 1025 may be performed by an extraction component 845 as described with reference to FIG. 8.

At 1030, the method may include performing a validation process on the integration flow based on one or more integration flow validation rules. The operations of block 1030 may be performed in accordance with examples as disclosed herein. In some examples, aspects of the operations of 1030 may be performed by a validation component 850 as described with reference to FIG. 8.

Figure 11:
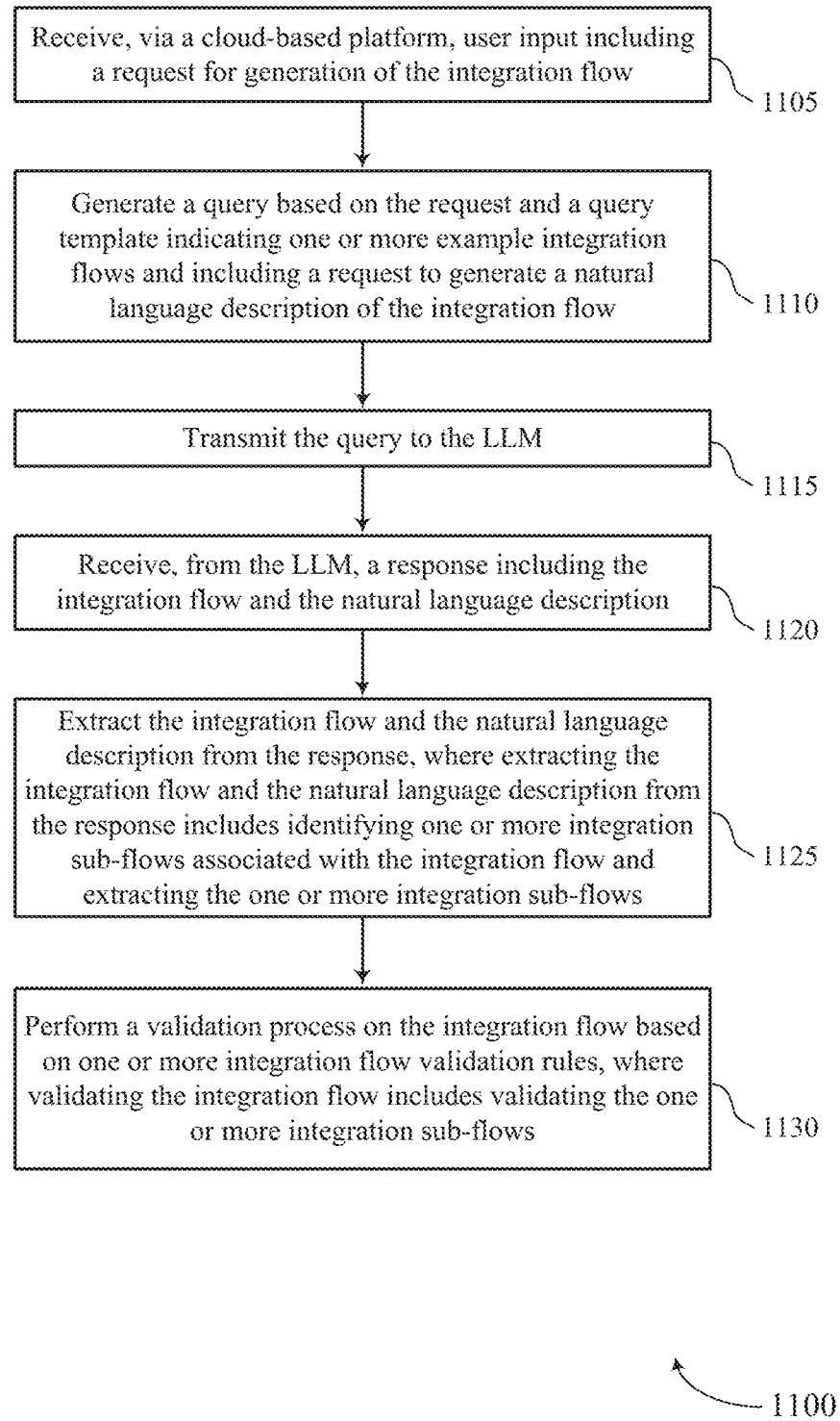

FIG. 11 shows a flowchart illustrating a method 1100 that supports integration flow generation using large language models in accordance with examples as disclosed herein. The operations of the method 1100 may be implemented by an application server or its components as described herein. For example, the operations of the method 1100 may be performed by an application server as described with reference to FIGS. 1 through 9. In some examples, an application server may execute a set of instructions to control the functional elements of the application server to perform the described functions. Additionally, or alternatively, the application server may perform aspects of the described functions using special-purpose hardware.

At 1105, the method may include receiving, via a cloud-based platform, user input including a request for generation of the integration flow. The operations of block 1105 may be performed in accordance with examples as disclosed herein. In some examples, aspects of the operations of 1105 may be performed by a request component 825 as described with reference to FIG. 8.

At 1110, the method may include generating a query based on the request and a query template indicating one or more example integration flows and including a request to generate a natural language description of the integration flow. The operations of block 1110 may be performed in accordance with examples as disclosed herein. In some examples, aspects of the operations of 1110 may be performed by a query generation component 830 as described with reference to FIG. 8.

At 1115, the method may include transmitting the query to the LLM. The operations of block 1115 may be performed in accordance with examples as disclosed herein. In some examples, aspects of the operations of 1115 may be performed by a query transmission component 835 as described with reference to FIG. 8.

At 1120, the method may include receiving, from the LLM, a response including the integration flow and the natural language description. The operations of block 1120 may be performed in accordance with examples as disclosed herein. In some examples, aspects of the operations of 1120 may be performed by a response component 840 as described with reference to FIG. 8.

At 1125, the method may include extracting the integration flow and the natural language description from the response, where extracting the integration flow and the natural language response includes identifying one or more integration sub-flows associated with the integration flow and extracting the one or more integration sub-flows. The operations of block 1125 may be performed in accordance with examples as disclosed herein. In some examples, aspects of the operations of 1125 may be performed by an extraction component 845 as described with reference to FIG. 8.

At 1130, the method may include performing a validation process on the integration flow based on one or more integration flow validation rules, where validating the integration flow includes validating the one or more integration sub-flows. The operations of block 1130 may be performed in accordance with examples as disclosed herein. In some examples, aspects of the operations of 1130 may be performed by a validation component 850 as described with reference to FIG. 8.

Figure 12:
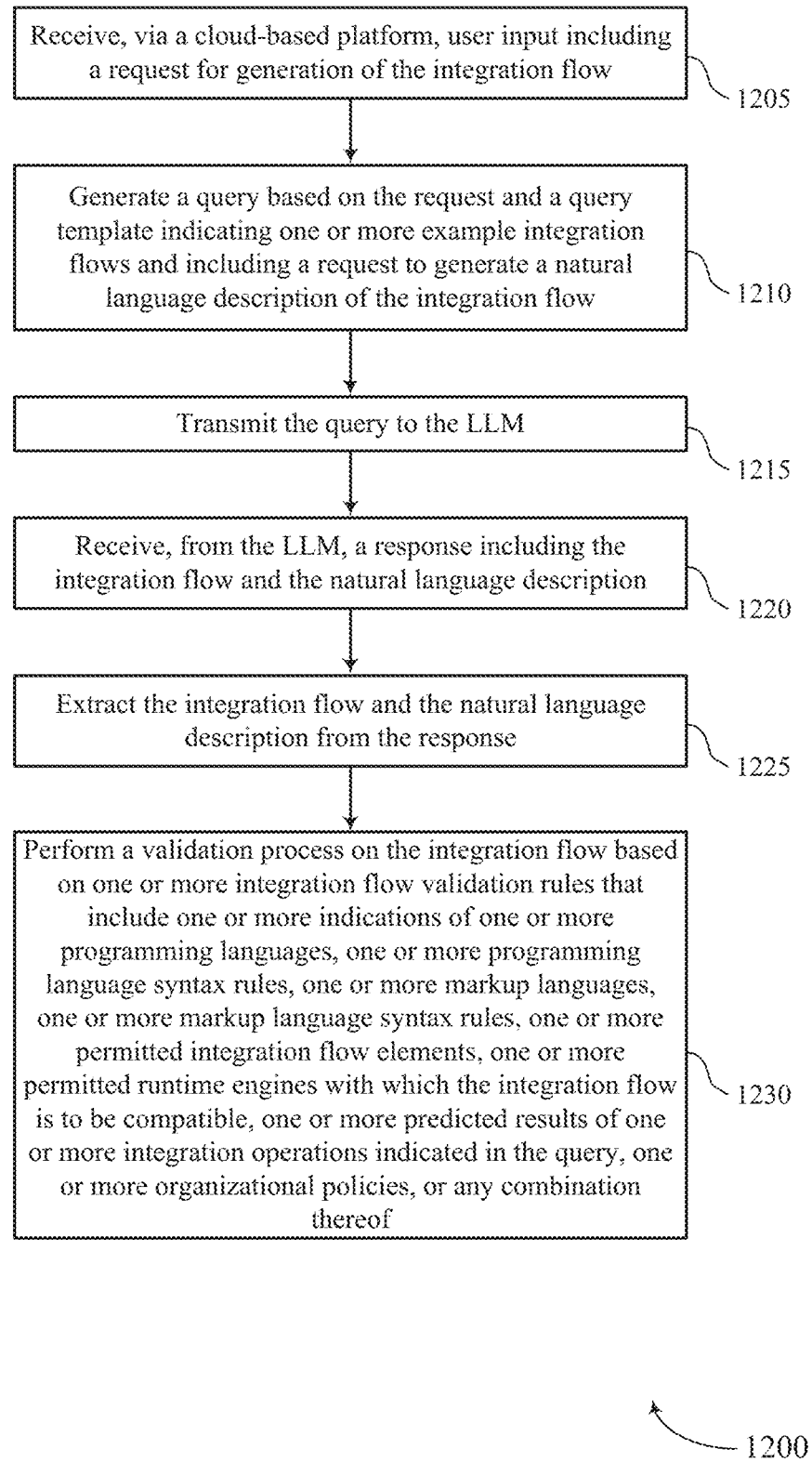

FIG. 12 shows a flowchart illustrating a method 1200 that supports integration flow generation using large language models in accordance with examples as disclosed herein. The operations of the method 1200 may be implemented by an application server or its components as described herein. For example, the operations of the method 1200 may be performed by an application server as described with reference to FIGS. 1 through 9. In some examples, an application server may execute a set of instructions to control the functional elements of the application server to perform the described functions. Additionally, or alternatively, the application server may perform aspects of the described functions using special-purpose hardware.

At 1205, the method may include receiving, via a cloud-based platform, user input including a request for generation of the integration flow. The operations of block 1205 may be performed in accordance with examples as disclosed herein. In some examples, aspects of the operations of 1205 may be performed by a request component 825 as described with reference to FIG. 8.

At 1210, the method may include generating a query based on the request and a query template indicating one or more example integration flows and including a request to generate a natural language description of the integration flow. The operations of block 1210 may be performed in accordance with examples as disclosed herein. In some examples, aspects of the operations of 1210 may be performed by a query generation component 830 as described with reference to FIG. 8.

At 1215, the method may include transmitting the query to the LLM. The operations of block 1215 may be performed in accordance with examples as disclosed herein. In some examples, aspects of the operations of 1215 may be performed by a query transmission component 835 as described with reference to FIG. 8.

At 1220, the method may include receiving, from the LLM, a response including the integration flow and the natural language description. The operations of block 1220 may be performed in accordance with examples as disclosed herein. In some examples, aspects of the operations of 1220 may be performed by a response component 840 as described with reference to FIG. 8.

At 1225, the method may include extracting the integration flow and the natural language description from the response. The operations of block 1225 may be performed in accordance with examples as disclosed herein. In some examples, aspects of the operations of 1225 may be performed by an extraction component 845 as described with reference to FIG. 8.

At 1230, the method may include performing a validation process on the integration flow based on one or more integration flow validation rules that include one or more indications of one or more programming languages, one or more programming language syntax rules, one or more markup languages, one or more markup language syntax rules, one or more permitted integration flow elements, one or more permitted runtime engines with which the integration flow is to be compatible, one or more predicted results of one or more integration operations indicated in the query, one or more organizational policies, or any combination thereof. The operations of block 1230 may be performed in accordance with examples as disclosed herein. In some examples, aspects of the operations of 1230 may be performed by a validation component 850 as described with reference to FIG. 8.

At 1235, the method may include the one or more integration flow validation rules including The operations of block 1235 may be performed in accordance with examples as disclosed herein. In some examples, aspects of the operations of 1235 may be performed by a validation component 850 as described with reference to FIG. 8.

A method for generating an integration flow with a large language model (LLM) by an apparatus is described. The method may include receiving, via a cloud-based platform, user input including a request for generation of the integration flow, generating a query based on the request and a query template indicating one or more example integration flows and including a request to generate a natural language description of the integration flow, transmitting the query to the LLM, receiving, from the LLM, a response including the integration flow and the natural language description, extracting the integration flow and the natural language description from the response, and performing a validation process on the integration flow based on one or more integration flow validation rules.

An apparatus for generating an integration flow with a large language model (LLM) is described. The apparatus may include one or more memories storing processor executable code, and one or more processors coupled with the one or more memories. The one or more processors may individually or collectively operable to execute the code to cause the apparatus to receive, via a cloud-based platform, user input including a request for generation of the integration flow, generate a query based on the request and a query template indicating one or more example integration flows and including a request to generate a natural language description of the integration flow, transmit the query to the LLM, receive, from the LLM, a response including the integration flow and the natural language description, extract the integration flow and the natural language description from the response, and perform a validation process on the integration flow based on one or more integration flow validation rules.

Another apparatus for generating an integration flow with a large language model (LLM) is described. The apparatus may include means for receiving, via a cloud-based platform, user input including a request for generation of the integration flow, means for generating a query based on the request and a query template indicating one or more example integration flows and including a request to generate a natural language description of the integration flow, means for transmitting the query to the LLM, means for receiving, from the LLM, a response including the integration flow and the natural language description, means for extracting the integration flow and the natural language description from the response, and means for performing a validation process on the integration flow based on one or more integration flow validation rules.

A non-transitory computer-readable medium storing code for generating an integration flow with a large language model (LLM) is described. The code may include instructions executable by a processor to receive, via a cloud-based platform, user input including a request for generation of the integration flow, generate a query based on the request and a query template indicating one or more example integration flows and including a request to generate a natural language description of the integration flow, transmit the query to the LLM, receive, from the LLM, a response including the integration flow and the natural language description, extract the integration flow and the natural language description from the response, and perform a validation process on the integration flow based on one or more integration flow validation rules.

Some examples of the method, apparatus, and non-transitory computer-readable medium described herein may further include operations, features, means, or instructions for extracting the integration flow and the natural language description from the response includes identifying one or more integration sub-flows associated with the integration flow and extracting the one or more integration sub-flows and validating the integration flow includes validating the one or more integration sub-flows.

In some examples of the method, apparatus, and non-transitory computer-readable medium described herein, the one or more integration flow validation rules include one or more indications of one or more programming languages, one or more programming language syntax rules, one or more markup languages, one or more markup language syntax rules, one or more permitted integration flow elements, one or more permitted runtime engines with which the integration flow may be compatible, one or more predicted results of one or more integration operations indicated in the query, one or more organizational policies, or any combination thereof.

In some examples of the method, apparatus, and non-transitory computer-readable medium described herein, the integration flow includes code that associates one or more input elements and one or more output elements via one or more integration operations in a runtime environment.

In some examples of the method, apparatus, and non-transitory computer-readable medium described herein, the query indicates the one or more input elements, the one or more output elements, one or more criteria associated with the one or more input elements, one or more criteria associated with the one or more output elements, or any combination thereof.

Some examples of the method, apparatus, and non-transitory computer-readable medium described herein may further include operations, features, means, or instructions for selecting the one or more example integration flows from a set of multiple example integration flows based on one or more first integration operations indicated in the query, the one or more example integration flows, or both, one or more actions identified in the query, one or more data processing components identified in the query, a similarity analysis between the query and one or more example queries associated with the set of multiple example integration flows, or any combination thereof.

In some examples of the method, apparatus, and non-transitory computer-readable medium described herein, the query template indicates one or more connector types permitted to be included in the integration flow, one or more integration flow components permitted to be included in the integration flow, or any combination thereof.

In some examples of the method, apparatus, and non-transitory computer-readable medium described herein, the query template indicates a runtime engine with which the integration flow may be compatible.

Some examples of the method, apparatus, and non-transitory computer-readable medium described herein may further include operations, features, means, or instructions for presenting, based on a positive validation result resulting from the validation process, the integration flow and the natural language description of the integration flow via a user interface.

Some examples of the method, apparatus, and non-transitory computer-readable medium described herein may further include operations, features, means, or instructions for training the LLM based on one or more prior queries, an acceptance metric associated with the one or more prior queries, a usage metric associated with the one or more prior queries, feedback associated with the one or more prior queries, or any combination thereof.

Some examples of the method, apparatus, and non-transitory computer-readable medium described herein may further include operations, features, means, or instructions for receiving additional user input including an instruction to execute the integration flow in a runtime environment and executing the integration flow in the runtime environment based on the additional user input.

In some examples of the method, apparatus, and non-transitory computer-readable medium described herein, the request for generation of the integration flow includes natural language input that indicates one or more characteristics of the integration flow.

The following provides an overview of aspects of the present disclosure:

Aspect 1: A method for generating an integration flow with a large language model (LLM), comprising: receiving, via a cloud-based platform, user input comprising a request for generation of the integration flow: generating a query based at least in part on the request and a query template indicating one or more example integration flows and comprising a request to generate a natural language description of the integration flow: transmitting the query to the LLM: receiving, from the LLM, a response comprising the integration flow and the natural language description: extracting the integration flow and the natural language description from the response; and performing a validation process on the integration flow based at least in part on one or more integration flow validation rules.

Aspect 2: The method of any of aspects 5 through 6, further comprising: selecting the one or more example integration flows from a plurality of example integration flows based at least in part on one or more first integration operations indicated in the query, the one or more example integration flows, or both, one or more actions identified in the query, one or more data processing components identified in the query, a similarity analysis between the query and one or more example queries associated with the plurality of example integration flows, or any combination thereof.

Aspect 3: The method of any of aspects 1 through 2, wherein the query template indicates one or more connector types permitted to be included in the integration flow, one or more integration flow components permitted to be included in the integration flow, or any combination thereof.

Aspect 4: The method of any of aspects 1 through 3, wherein the query template indicates a runtime engine with which the integration flow is to be compatible.

Aspect 5: The method of any of aspects 1 through 8, wherein the integration flow comprises code that associates one or more input elements and one or more output elements via one or more integration operations in a runtime environment.

Aspect 6: The method of aspect 5, wherein the query indicates the one or more input elements, the one or more output elements, one or more criteria associated with the one or more input elements, one or more criteria associated with the one or more output elements, or any combination thereof.

Aspect 7: The method of aspect 1, wherein extracting the integration flow and the natural language description from the response comprises identifying one or more integration sub-flows associated with the integration flow and extracting the one or more integration sub-flows; and validating the integration flow comprises validating the one or more integration sub-flows.

Aspect 8: The method of any of aspects 1 through 7, wherein the one or more integration flow validation rules comprise one or more indications of one or more programming languages, one or more programming language syntax rules, one or more markup languages, one or more markup language syntax rules, one or more permitted integration flow elements, one or more permitted runtime engines with which the integration flow is to be compatible, one or more predicted results of one or more integration operations indicated in the query, one or more organizational policies, or any combination thereof.

Aspect 9: The method of any of aspects 1 through 4, further comprising: presenting, based at least in part on a positive validation result resulting from the validation process, the integration flow and the natural language description of the integration flow via a user interface.

Aspect 10: The method of any of aspects 1 through 9, further comprising: training the LLM based at least in part on one or more prior queries, an acceptance metric associated with the one or more prior queries, a usage metric associated with the one or more prior queries, feedback associated with the one or more prior queries, or any combination thereof.

Aspect 11: The method of any of aspects 1 through 10, further comprising: receiving additional user input comprising an instruction to execute the integration flow in a runtime environment; and executing the integration flow in the runtime environment based at least in part on the additional user input.

Aspect 12: The method of any of aspects 1 through 11, wherein the request for generation of the integration flow comprises natural language input that indicates one or more characteristics of the integration flow.

Aspect 13: An apparatus for generating an integration flow with a large language model (LLM), comprising one or more memories storing processor-executable code, and one or more processors coupled with the one or more memories and individually or collectively operable to execute the code to cause the apparatus to perform a method of any of aspects 1 through 12.

Aspect 14: An apparatus for generating an integration flow with a large language model (LLM), comprising at least one means for performing a method of any of aspects 1 through 12.

Aspect 15: A non-transitory computer-readable medium storing code for generating an integration flow with a large language model (LLM), the code comprising instructions executable by a processor to perform a method of any of aspects 1 through 12.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating an integration flow with a large language model (LLM), comprising:
   receiving, via a cloud-based platform, user input comprising a request for generation of the integration flow, the integration flow comprising code to interface, within a runtime environment, one or more processing elements with one or more input elements that provide data and with one or more output elements that accept a processed version of the data processed by the one or more processing elements;
   generating a query based at least in part on the request and a query template indicating one or more example integration flows and comprising a request to generate a natural language description of the integration flow, the query template selected from a plurality of query templates selected based at least in part on the request;
   transmitting the query to the LLM;

receiving, from the LLM, a response comprising the integration flow and the natural language description;

extracting the integration flow and the natural language description from the response; and performing a validation process on the integration flow based at least in part on one or more integration flow validation rules.

2. The method of claim 1, further comprising:

selecting the one or more example integration flows from a plurality of example integration flows based at least in part on one or more first integration operations indicated in the query, one or more second integration operations indicated in the one or more example integration flows, one or more actions identified in the query, one or more data processing components identified in the query, a similarity analysis between the query and one or more example queries associated with the plurality of example integration flows, or any combination thereof.

3. The method of claim 1, wherein the query template indicates one or more connector types permitted to be included in the integration flow, one or more integration flow components permitted to be included in the integration flow, or any combination thereof.

4. The method of claim 1, wherein the query template indicates a runtime engine with which the integration flow is to be compatible.

5. The method of claim 1, wherein the query indicates the one or more input elements, the one or more output elements, one or more criteria associated with the one or more input elements, the one or more output elements, or both, or any combination thereof.

6. The method of claim 1, wherein:

extracting the integration flow and the natural language description from the response comprises identifying one or more integration sub-flows associated with the integration flow and extracting the one or more integration sub-flows; and validating the integration flow comprises validating the one or more integration sub-flows.

7. The method of claim 1, wherein the one or more integration flow validation rules comprise one or more indications of one or more programming languages, one or more programming language syntax rules, one or more markup languages, one or more markup language syntax rules, one or more permitted integration flow elements, one or more permitted runtime engines with which the integration flow is to be compatible, one or more predicted results of one or more integration operations indicated in the query, one or more organizational policies, or any combination thereof.

8. The method of claim 1, further comprising:

presenting, based at least in part on a positive validation result resulting from the validation process, the integration flow and the natural language description of the integration flow via a user interface.

9. The method of claim 1, further comprising:

training the LLM based at least in part on one or more prior queries, an acceptance metric associated with the one or more prior queries, a usage metric associated with the one or more prior queries, feedback associated with the one or more prior queries, or any combination thereof.

10. The method of claim 1, further comprising:

receiving additional user input comprising an instruction to execute the integration flow in a runtime environment; and executing the integration flow in the runtime environment based at least in part on the additional user input.

11. The method of claim 1, wherein the request for generation of the integration flow comprises natural language input that indicates one or more characteristics of the integration flow.

12. An apparatus for generating an integration flow with a large language model (LLM), comprising:

one or more memories storing processor-executable code; and one or more processors coupled with the one or more memories and individually or collectively operable to execute the code to cause the apparatus to:

receive, via a cloud-based platform, user input comprising a request for generation of the integration flow, the integration flow comprising code to interface, within a runtime environment, one or more processing elements with one or more input elements that provide data and with one or more output elements that accept a processed version of the data processed by the one or more processing elements;

generate a query based at least in part on the request and a query template indicating one or more example integration flows and comprising a request to generate a natural language description of the integration flow, the query template selected from a plurality of query templates selected based at least in part on the request;

transmit the query to the LLM;

receive, from the LLM, a response comprising the integration flow and the natural language description;

extract the integration flow and the natural language description from the response; and perform a validation process on the integration flow based at least in part on one or more integration flow validation rules.

13. The apparatus of claim 12, wherein the one or more processors are individually or collectively further operable to execute the code to cause the apparatus to:

select the one or more example integration flows from a plurality of example integration flows based at least in part on one or more first integration operations indicated in the query, one or more second integration operations indicated in the one or more example integration flows, one or more actions identified in the query, one or more data processing components identified in the query, a similarity analysis between the query and one or more example queries associated with the plurality of example integration flows, or any combination thereof.

14. The apparatus of claim 12, wherein the query template indicates one or more connector types permitted to be included in the integration flow, one or more integration flow components permitted to be included in the integration flow, or any combination thereof.

15. The apparatus of claim 12, wherein the query template indicates a runtime engine with which the integration flow is to be compatible.

16. The apparatus of claim 12, wherein:

extracting the integration flow and the natural language description from the response comprises identifying one or more integration sub-flows associated with the integration flow and extracting the one or more integration sub-flows; and validating the integration flow comprises validating the one or more integration sub-flows.

17. The apparatus of claim 12, wherein the one or more integration flow validation rules comprise one or more indications of one or more programming languages, one or more programming language syntax rules, one or more markup languages, one or more markup language syntax rules, one or more permitted integration flow elements, one or more permitted runtime engines with which the integration flow is to be compatible, one or more predicted results of one or more integration operations indicated in the query, one or more organizational policies, or any combination thereof.

18. A non-transitory computer-readable medium storing code for generating an integration flow with a large language model (LLM), the code comprising instructions executable by one or more processors to:
- receive, via a cloud-based platform, user input comprising a request for generation of the integration flow, the integration flow comprising code to interface, within a runtime environment, one or more processing elements with one or more input elements that provide data and with one or more output elements that accept a processed version of the data processed by the one or more processing elements;
- generate a query based at least in part on the request and a query template indicating one or more example integration flows and comprising a request to generate a natural language description of the integration flow, the query template selected from a plurality of query templates selected based at least in part on the request;
- transmit the query to the LLM;
- receive, from the LLM, a response comprising the integration flow and the natural language description;
- extract the integration flow and the natural language description from the response; and
- perform a validation process on the integration flow based at least in part on one or more integration flow validation rules.

* * * * *